United States Patent
Yamada et al.

(10) Patent No.: US 9,906,946 B2
(45) Date of Patent: Feb. 27, 2018

(54) USER EQUIPMENT CAPABILITY SIGNALING

(71) Applicant: Sharp Kabushiki Kaisha, Osaka-shi, Osaka (JP)

(72) Inventors: Shohei Yamada, Camas, WA (US); John Kowalski, Camas, WA (US); Zhanping Yin, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/051,830

(22) Filed: Feb. 24, 2016

(65) Prior Publication Data

US 2016/0192182 A1   Jun. 30, 2016

Related U.S. Application Data

(63) Continuation of application No. 13/250,931, filed on Sep. 30, 2011, now Pat. No. 9,277,398.

(60) Provisional application No. 61/526,179, filed on Aug. 22, 2011.

(51) Int. Cl.
| | |
|---|---|
| *H04J 3/00* | (2006.01) |
| *H04W 8/24* | (2009.01) |
| *H04W 28/18* | (2009.01) |
| *H04L 5/14* | (2006.01) |
| *H04W 72/04* | (2009.01) |

(52) U.S. Cl.
CPC ............ *H04W 8/24* (2013.01); *H04L 5/14* (2013.01); *H04W 28/18* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 2011/0205976 A1* | 8/2011 | Roessel | H04L 5/001 370/329 |
| 2012/0008600 A1* | 1/2012 | Marinier | H04L 5/001 370/336 |
| 2012/0094706 A1 | 4/2012 | Fukumoto et al. | |

FOREIGN PATENT DOCUMENTS

| | | |
|---|---|---|
| CN | 102045763 A | 5/2011 |
| WO | 2007/116224 A1 | 10/2007 |
| WO | 2010/137259 A1 | 12/2010 |

(Continued)

OTHER PUBLICATIONS

Yamada et al., "User Equipment Capability Signaling", U.S. Appl. No. 13/250,931, filed Sep. 30, 2011.

(Continued)

*Primary Examiner* — Kibrom T Hailu
(74) *Attorney, Agent, or Firm* — Keating & Bennett, LLP

(57) ABSTRACT

A user equipment (UE) configured for signaling UE capability is described. The UE includes a processor and instructions stored in memory that is in electronic communication with the processor. The UE sends an indicator regarding whether the UE can support different time division duplex (TDD) configurations on different bands for a band combination. The UE also sends an indicator regarding whether the UE can support concurrent transmission and reception on different bands for the band combination. The UE additionally sends an indicator regarding whether the UE can support different uplink timing adjustments for the band combination.

4 Claims, 8 Drawing Sheets

(56) References Cited

FOREIGN PATENT DOCUMENTS

WO    2012/175030 A1    12/2012

OTHER PUBLICATIONS

Figure 1:
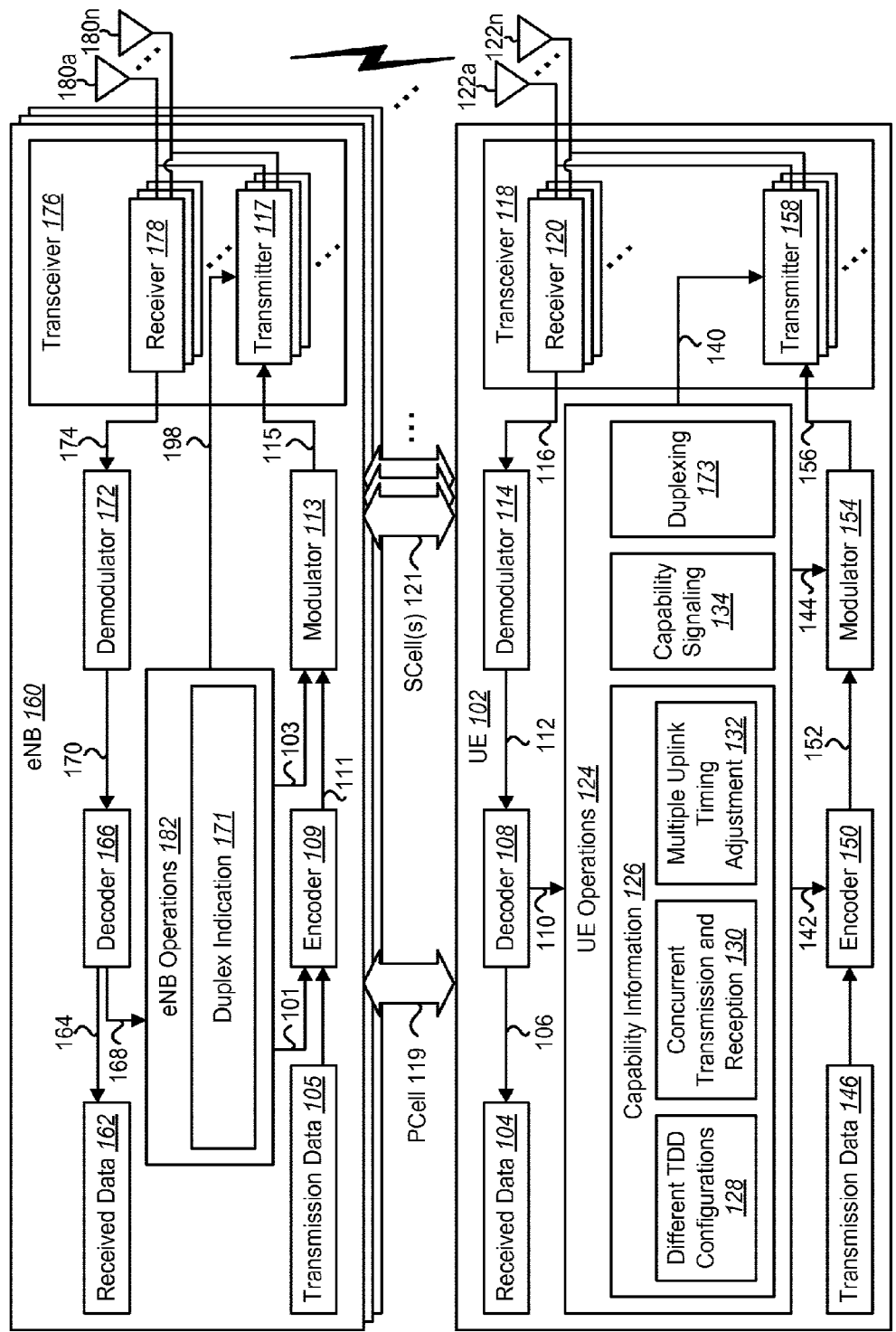

Catt, "TDD Inter-band Carrier Aggregation", 3GPP TSG-RAN WG1 Meeting #66, R1-112106, Aug. 16, 2011, 6 pages.

* cited by examiner

USER EQUIPMENT CAPABILITY SIGNALING

RELATED APPLICATIONS

This application is related to and claims priority from U.S. Provisional Patent Application Ser. No. 61/526,176 filed Aug. 22, 2011, for UE CAPABILITY FOR CARRIER AGGREGATION, with inventors Shohei Yamada, John Michael Kowalski and Zhanping Yin, which is incorporated herein by reference.

TECHNICAL FIELD

The present disclosure relates generally to communication systems. More specifically, the present disclosure relates to user equipment (UE) capability signaling.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station.

As wireless communication devices have advanced, improvements in communication capacity, speed and/or quality have been sought. However, improvements in communication capacity, speed and/or quality may require increased resources.

For example, wireless communication devices may communicate with one or more devices using multiple channels or cells. However, communicating with one or more devices using multiple channels or cells may pose certain challenges. As illustrated by this discussion, systems and methods that enable or improve communication using multiple channels or cells may be beneficial.

BRIEF DESCRIPTION OF THE DRAWINGS

FIG. 1 is a block diagram illustrating one configuration of a user equipment (UE) and one or more evolved Node Bs (eNBs) in which systems and methods for signaling a UE capability may be implemented;

FIG. 2 is a flow diagram illustrating one configuration of a method for signaling a user equipment (UE) capability;

FIG. 3 is a flow diagram illustrating one configuration of a method for receiving signaling for UE capability;

FIG. 4 is a diagram illustrating sets of subframes for multiple cells;

FIG. 5 is a block diagram illustrating one configuration of user equipment (UE) capability signaling;

FIG. 6 is a block diagram illustrating one configuration of radio resource control (RRC) signaling;

FIG. 7 illustrates various components that may be utilized in a user equipment (UE); and FIG. 8 illustrates various components that may be utilized in an evolved Node B (eNB).

DETAILED DESCRIPTION

A user equipment (UE) configured for signaling UE capability is disclosed. The UE includes a processor and instructions stored in memory that is in electronic communication with the processor. The UE sends an indicator regarding whether the UE can support different time division duplex (TDD) configurations on different bands for a band combination. The UE also sends an indicator regarding whether the UE can support concurrent transmission and reception on different bands for the band combination. The UE further sends an indicator regarding whether the UE can support different uplink timing adjustments for the band combination.

The UE may also receive radio resource control (RRC) signaling and determine whether to perform concurrent transmission and reception. The UE may follow a subframe configuration for all cells in a collision subframe if it is determined not to perform concurrent transmission and reception. The UE may select one subframe configuration and mute other cells with other subframe configurations if it is determined not to perform concurrent transmission and reception. The UE may concurrently send information and receive information on different bands if it is determined to perform concurrent transmission and reception.

UE-EUTRA-Capability-v11xx-IEs information may include at least one of the indicator regarding whether the UE can support different TDD configurations on different bands for the band combination, the indicator regarding whether the UE can support concurrent transmission and reception on different bands for the band combination and the indicator regarding whether the UE can support different uplink timing adjustments for the band combination. A category indicator may include at least one of the indicator regarding whether the UE can support different TDD configurations on different bands for the band combination, the indicator regarding whether the UE can support concurrent transmission and reception on different bands for the band combination and the indicator regarding whether the UE can support different uplink timing adjustments for the band combination. A compliance indicator may include at least one of the indicator regarding whether the UE can support different TDD configurations on different bands for the band combination, the indicator regarding whether the UE can support concurrent transmission and reception on different bands for the band combination and the indicator regarding whether the UE can support different uplink timing adjustments for the band combination.

An evolved Node B (eNB) configured for receiving signaling for user equipment (UE) capability is also disclosed. The eNB includes a processor and executable instructions stored in memory that is in electronic communication with the processor. The eNB receives an indicator regarding whether a UE can support different time division duplex (TDD) configurations on different bands for a band combination. The eNB also receives an indicator regarding whether the UE can support concurrent transmission and reception on different bands for the band combination. The eNB further receives an indicator regarding whether the UE can support different uplink timing adjustments for the band combination.

The eNB may send radio resource control (RRC) signaling that indicates whether the UE is required to perform concurrent transmission and reception. UE-EUTRA-Capability-v11xx-IEs information may include at least one of the indicator regarding whether the UE can support different TDD configurations on different bands for the band combination, the indicator regarding whether the UE can support concurrent transmission and reception on different bands for the band combination and the indicator regarding whether the UE can support different uplink timing adjustments for the band combination.

A category indicator may include at least one of the indicator regarding whether the UE can support different TDD configurations on different bands for the band combination, the indicator regarding whether the UE can support concurrent transmission and reception on different bands for the band combination and the indicator regarding whether the UE can support different uplink timing adjustments for the band combination. A compliance indicator may include at least one of the indicator regarding whether the UE can support different TDD configurations on different bands for the band combination, the indicator regarding whether the UE can support concurrent transmission and reception on different bands for the band combination and the indicator regarding whether the UE can support different uplink timing adjustments for the band combination.

A method for signaling user equipment (UE) capability from a UE is also disclosed. The method includes sending an indicator regarding whether the UE can support different TDD configurations on different bands for a band combination. The method further includes sending an indicator regarding whether the UE can support concurrent transmission and reception on different bands for the band combination. The method also includes sending an indicator regarding whether the UE can support different uplink timing adjustments for the band combination.

A method for receiving signaling for user equipment (UE) capability by an evolved Node B (eNB) is also disclosed. The method includes receiving an indicator regarding whether a UE can support different TDD configurations on different bands for a band combination. The method also includes receiving an indicator regarding whether the UE can support concurrent transmission and reception on different bands for the band combination. The method further includes receiving an indicator regarding whether the UE can support different uplink timing adjustments for the band combination.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP specifications (e.g., LTE, LTE-Advanced (LTE-A), Release-8, Release-10, Release-11, Global System for Mobile Communications (GSM), etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a user equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands to be used for communication between a Node B (e.g., eNodeB) and a UE. "Configured cells" are those cells of which the UE is aware and is allowed by a Node B (e.g., eNB) to transmit or receive information. "Configured cell(s)" may be serving cell(s). The UE may receive system information and perform the required measurements on all configured cells. "Activated cells" are those configured cells on which the UE is transmitting or receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics. For instance, a spatial characteristic of a cell may be described in terms of size.

The systems and methods disclosed herein describe how a long-term evolution (LTE) Release-11 or later user equipment (UE) may be designed to communicate in multiple time division duplexing (TDD) configurations. Furthermore, the systems and methods disclosed herein describe how the UE may behave when the UE is configured for different time division duplexing (TDD) uplink-downlink (UL-DL) subframe configurations for different bands or different cells or carriers.

In 3GPP LTE Release-10 (LTE-A or Advanced E-UTRAN), carrier aggregation is introduced. Rel-10 TDD allowed having only one unified TDD uplink-downlink configuration for all serving cells. In Rel-11, LTE carrier aggregation enhancement or "Support of inter-band carrier aggregation for TDD DL and UL including different uplink-downlink configurations on different bands" is being investigated. One of the advantages of a TDD approach is the flexible resource utilization through different TDD configurations. By configuring different TDD configurations, the ratio between available UL and DL resources can range from 3UL:2DL to 1UL:9DL.

The benefit of a flexible arrangement of TDD configurations for different cells means this design may enable more free and efficient network deployment for a TDD operator that holds multiple carriers on different bands, if various TDD configurations can be employed on different bands. For example, the operator might use a configuration that has more UL time/frequency resources than the DL on a lower-frequency band to improve UL coverage and battery life (because propagation loss is less at lower frequencies), while a DL-heavy configuration could be used on a higher-frequency band to boost DL capacity for a hotspot or indoor area.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a user equipment (UE) 102 and one or more evolved Node Bs (eNBs) 160 in which systems and methods for signaling a UE capability may be implemented. In some configurations, the UE capability may be signaled for carrier aggregation. The UE 102 communicates with an evolved Node B (eNB) 160 using one or more antennas 122a-n. For example, the UE 102 transmits electromagnetic signals to the eNB 160 and receives electromagnetic signals from the eNB 160 using the one or more antennas 122a-n. The eNB 160 communicates with the UE 102 using one or more antennas 180a-n. It should be noted that the eNB 160 may be a Node B, home evolved Node B (HeNB) or other kind of base station in some configurations.

The UE 102 and the eNB 160 may use one or more cells (e.g., channels, carrier components, etc.) 119, 121 to communicate with each other. For example, the UE 102 and eNB 160 may use the cells 119, 121 to carry one or more channels (e.g., Physical Uplink Control Channel (PUCCH), Physical Uplink Shared Channel (PUSCH), physical downlink control channel (PDCCH), etc.) A PUCCH is one example of a control channel pursuant to 3GPP specifications. Other kinds of channels may be used.

In accordance with the systems and methods disclosed herein, multiple kinds of cells 119, 121 and/or multiple groups of cells 119, 121 may be used for communication. As used herein, the term "group" may denote a group of one or more entities. A primary cell (PCell) may be a primary cell in accordance with 3GPP specifications. A secondary cell (SCell) may be a secondary cell in accordance with 3GPP specifications. One kind of group may include a PCell 119. In some cases, one or more SCells 121 may also be included in a group with a PCell 119. Another kind of group may include one or more SCells 121. The uplink of the one or more serving cells 119, 121 in each group may have the same uplink transmission timing. For example, each of one or more SCells 121 in each group may share the same uplink transmission timing.

In one case, a single eNB 160 may communicate with the UE 102 using a PCell 119 and one or more SCells 121. In another case, one eNB 160 may communicate with the UE 102 using the PCell 119 (and optionally one or more SCells 121, for example), while another eNB 160 may communicate with the UE 102 using one or more SCells 121.

The UE 102 may include one or more transceivers 118, one or more demodulators 114, one or more decoders 108, one or more encoders 150, one or more modulators 154 and an UE operations module 124. For example, one or more reception and/or transmission paths may be used in the UE 102. For convenience, only a single transceiver 118, decoder 108, demodulator 114, encoder 150 and modulator 154 are illustrated, though multiple parallel elements (e.g., transceivers 118, decoders 108, demodulators 114, encoders 150 and modulators 154) may be used depending on the configuration.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data 104. A second UE-decoded signal 110 may comprise overhead data and/or control data. For example, the second UE-decoded signal 110 may provide data that may be used by the UE operations module 124 to perform one or more operations. For instance, the second UE-decoded signal 110 may comprise a UECapabilityEnquiry message or an RRCConnectionReconfiguration message received from the eNB 160.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with one or more eNBs 160. The UE operations module 124 may include capability information 126, a capability signaling module 134 and a duplexing module 173. The capability information 126 may include information that indicates whether the UE 102 is capable of supporting different TDD configurations 128, supporting concurrent transmission and reception 130 and supporting multiple uplink timing adjustment 132.

The capability signaling module 134 may generate messages based on the capability information 126. For example, the capability signaling module 134 may generate a message indicating that the UE 102 is capable of supporting different TDD configurations on different bands for one or more band combinations. In another example, the capability signaling module 134 may generate a message indicating that the UE 102 is capable of supporting concurrent (e.g., simultaneous) transmission and reception on different bands for one or more band combinations. In yet another example, the capability signaling module 134 may generate a message indicating that the UE 102 is capable of supporting different uplink timing adjustments for one or more band combinations. The messages may be generated in accordance with the description provided in connection with FIG. 5 below.

The duplexing module 173 may control whether the UE 102 communicates using full duplexing or half duplexing. For example, the UE 102 may receive signaling (e.g., a message) from the eNB 160 that requires the UE 102 to communicate with the eNB 160 using full duplexing or half duplexing. In full duplexing, the UE 102 may transmit and receive information concurrently. In half duplexing, the UE 102 may only transmit information or receive information at one time. In some configurations, the UE 102 may set (e.g., reconfigure) a duplexing mode based on a message received from the eNB 106 and may send a message to the eNB 160 indicating that the duplexing mode has been set (e.g., reconfigured).

In one example, the UE 102 is configured by the eNB 160 using RRC signaling, indicating whether the UE 102 is required to perform concurrent transmission and reception or not. If the UE 102 is configured to not perform concurrent (e.g., simultaneous) transmission and reception or full duplex, the UE 102 may follow one of the subframe configurations for all cells (e.g., cells 119, 121) in a collision subframe or select one of the subframe configurations and mute other cells with other subframe configuration(s) in the collision subframe. A "collision subframe" may be a subframe in which different configurations assign different types of subframes (e.g., uplink, downlink, special). More detail regarding duplexing and signaling related to duplexing is given in connection with FIGS. 2, 3 and 6 below.

In some configurations, the UE 102 may determine multiple cells 119, 121. For example, the UE 102 may monitor one or more frequency bands to detect whether one or more eNBs 160 may provide access to cells 119, 121. For instance, the UE 102 may receive a broadcast, timing or beacon signal from one or more eNBs 160 indicating that the one or more eNBs 160 may provide cell(s) 119, 121 for communication. In another example, the UE 102 may transmit a signal or message to one or more eNBs 160. The one or more eNBs 160 may then send a signal in response to the UE 102 indicating that one or more cells 119, 121 may be used for communication.

In one configuration, the UE 102 may adjust its uplink transmission timing for a physical uplink control channel (PUCCH), physical uplink shared channel (PUSCH) and/or sounding reference signal (SRS) of a primary cell (PCell) 119 based on a timing advance command.

In one configuration, the uplink transmission timing for a PUSCH and/or SRS of each SCell 121 in a group with a PCell 119 may be the same as the uplink transmission timing for the corresponding PCell 119. In accordance with the systems and methods disclosed herein, the uplink transmission timing for a PUSCH and/or SRS of each SCell 121 in a group without the PCell 119 may share the same as the uplink transmission timing (with one particular SCell 121, for example). It should be noted that each serving cell 119, 121 may have a downlink and/or uplink.

Uplink transmission timing may need to be adjusted since signals from the UE 102 may need to reach one or more eNBs 160 at one or more specified times. For example, all signals being transmitted to an eNB 160 may need to arrive at the same time or within a cyclic prefix in an OFDM symbol at the eNB 160.

The UE operations module 124 may provide information 142 to the encoder 150. This information 142 may include instructions for the encoder 150 and/or data to be encoded. For example, the UE operations module 124 may instruct the encoder 150 to shift transmission timing for a PCell 119 and/or one or more SCells 121 and/or instruct the encoder 150 regarding an encoding rate. Additionally or alternatively, the information 142 may include data to be encoded, such as UE 102 capability information 126 and/or other control data (e.g., a UECapabilityInformation message, an RRCConnectionReconfigurationComplete message, etc.).

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, etc. The encoder 150 may provide encoded data 152 to the modulator 154.

The UE operations module 124 may provide information 144 to the modulator 154. This information 144 may include instructions for the modulator 154. For example, the UE operations module 124 may instruct the modulator 154 to shift transmission timing for a PCell 119 and/or one or more SCells 121 and/or instruct the modulator 154 regarding a modulation type (e.g., constellation mapping). The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 to shift transmission timing for a PCell 119 and/or one or more SCells 121. In another example, the UE operations module 124 may instruct the one or more transmitters 158 whether to transmit according to full duplex (e.g., while the one or more receivers 120 are receiving) or half duplex (e.g., not while the one or more receivers 120 are receiving). The one or more transmitters 158 may upconvert and transmit the modulated signal(s) 156 to one or more eNBs 160. It should be noted that the UE 102 may need to have more than one transmitter 158 in order to perform multiple uplink timing adjustments.

Each of the one or more eNBs 160 may include one or more transceivers 176, one or more demodulators 172, one or more decoders 166, one or more encoders 109, one or more modulators 113 and an eNB operations module 182. For example, one or more reception and/or transmission paths may be used in an eNB 160. For convenience, only a single transceiver 176, decoder 166, demodulator 172, encoder 109 and modulator 113 are illustrated, though multiple parallel elements (e.g., transceivers 176, decoders 166, demodulators 172, encoders 109 and modulators 113) may be used depending on the configuration.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data 162. A second eNB-decoded signal 168 may comprise overhead data and/or control data. For example, the second eNB-decoded signal 168 may provide data that may be used by the eNB operations module 182 to perform one or more operations (e.g., a UECapabilityInformation message or an RRCConnectionReconfigurationComplete message received from the UE 102).

In general, the eNB operations module 182 may enable the eNB 160 to communicate with a UE 102 that is using one or more cells 119, 121. The eNB operations module 182 may manage the transmission timing for one or more cells 119, 121. For example, the eNB operations module 182 may generate a UE capability enquiry or UE capability request. Additionally or alternatively, the eNB operations module may control communications with the UE 102 based on UE 102 capability information received from the UE 102.

In one configuration, the eNB operations module 182 may include a duplex indication module 171. The duplex indication module 171 may generate signaling (e.g., an RRC-ConnectionReconfiguration message) that indicates whether the UE 102 is required to communicate according to full duplex or half duplex. For example, the eNB 160 may determine whether the UE 102 is required to communicate according to full duplex or half duplex based on UE 102 capability information received from the UE 102. More detail regarding signaling to indicate duplexing is given in connection with FIG. 6.

The eNB operations module 182 may provide information 101 to the encoder 109. This information 101 may include instructions for the encoder 109 and/or data to be encoded. For example, the eNB operations module 182 may instruct the encoder 109 regarding an encoding rate. Additionally or alternatively, the information 101 may include data to be encoded (e.g., a UECapabilityEnquiry message, an RRC-ConnectionReconfiguration message, etc.). For example, the eNB operations module may provide a UE capability enquiry or request to the encoder for transmission.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may instruct the modulator 113 regarding a modulation type (e.g., constellation mapping). The modulator 113 may modulate the encoded data 111 to provide one or more modulated signals 115 to the one or more transmitters 117.

The eNB operations module 182 may provide information 198 to the one or more transmitters 117. This information 198 may include instructions for the one or more transmitters 117. For example, the eNB operations module 182 may instruct the one or more transmitters 117 to transmit using one or more cells 119, 121. The one or more transmitters 117 may upconvert and transmit the modulated signal(s) 115 to the UE 102.

Figure 2:
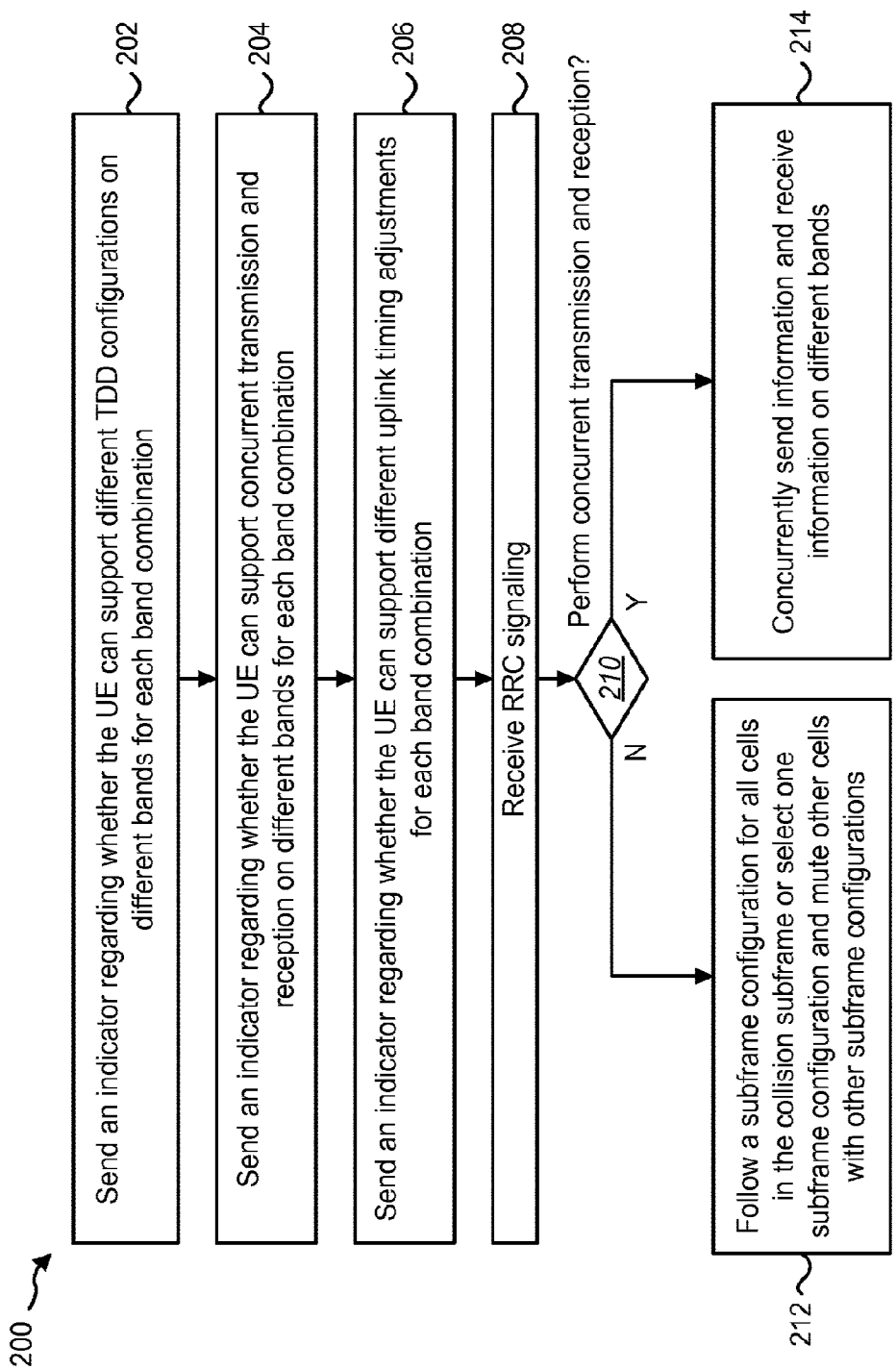

FIG. 2 is a flow diagram illustrating one configuration of a method 200 for signaling a user equipment (UE) capability. For example, the method 200 may describe signaling for UE 102 capability for carrier aggregation. A UE 102 that is designed to communicate with different TDD uplink/downlink configurations may indicate its capability to an eNB 160. For example, a UE 102 may send 202 an indicator regarding whether the UE 102 can support different TDD configurations on different bands for one or more band combinations. For instance, the UE 102 informs an eNB 160 of its capability, including whether the UE 102 can support different TDD configurations on different bands for each band combination.

In one configuration, the indicator that is sent 202 may comprise a UE category. For example, UEs in a particular category may be capable of supporting different TDD configurations, which may be indicated by a UE category. In another configuration, the indicator that is sent 202 may comprise information that indicates compliance with a particular specification release. For example, all Release-11 UEs may be capable of supporting different TDD configurations, which may be indicated by a compliance or release number indicator.

The UE 102 may send 204 an indicator regarding whether the UE 102 can support concurrent transmission and reception on different bands for each band combination. For example, the UE 102 informs an eNB 160 of its capability, including whether the UE 102 can support simultaneous transmission and reception on different bands for each band combination.

In one configuration, the indicator that is sent 204 may comprise a UE category indicator. For example, UEs in a particular category may be capable of supporting concurrent transmission and reception on different bands, which may be indicated by a UE category indicator. In another configuration, the indicator that is sent 202 may comprise information that indicates compliance with a particular specification release. For example, all Release-11 UEs may be capable of supporting concurrent transmission and reception on different bands, which may be indicated by a compliance or release number indicator.

The UE 102 may send 206 an indicator regarding whether the UE 102 can support different uplink timing adjustments for each band combination. For example, the UE 102 informs an eNB 160 of its capability to support different uplink timing adjustments for each band combination. The indicator(s) sent 202, 204, 206 indicating UE 102 capability may be formatted in accordance with the description given in connection with FIG. 5 below. One or more of the indicators may be sent in one or more messages and/or may be indicated explicitly or implicitly.

In one configuration, the indicator that is sent 206 may comprise a UE category indicator. For example, UEs in a particular category may be capable of supporting different uplink timing adjustments for each band combination, which may be indicated by a UE category indicator. In another configuration, the indicator that is sent 202 may comprise information that indicates compliance with a particular specification release. For example, all Release-11 UEs may be capable of supporting different uplink timing adjustments for each band combination, which may be indicated by a compliance or release number indicator. In some configurations, one or more of the indicators described may be included in a UECapabilityInformation message. In some configurations, sending 202, 204, 206 one or more of the indicators may be done in response to reception of a UECapabilityEnquiry message from the eNB 160.

The UE 102 may receive 208 radio resource control (RRC) signaling. For example, the UE 102 may receive RRCConnectionReconfiguration signaling from an eNB 160 that requires the UE 102 to communicate using full duplex or half duplex communications. For instance, the UE 102 is configured by an eNB 160 using RRC signaling, whether the UE 102 is required to perform concurrent (e.g., simultaneous) transmission and reception or not.

The UE 102 may determine 210 whether to perform concurrent transmission and reception. For example, the UE 102 may determine 210 whether to communication using full duplex communications or half duplex communications. The UE 102 may make this determination 210 based on the RRC signaling received from the eNB 160, which may specify which type of duplexing is required.

If the UE 102 is configured with not performing concurrent (e.g., simultaneous) transmission and reception (e.g., the UE 102 is configured for performing half duplex communications), the UE 102 may follow 212 one of the subframe configurations for all cells in the collision subframe or select 212 one of the subframe configurations (for one cell, for example) and mute (e.g., disregard) other cells with other subframe configurations in the collision subframe.

In the case that the UE 102 is configured to perform concurrent (e.g., simultaneous) transmission and reception (e.g., full duplex), the UE 102 may concurrently send 214 information and receive 214 information on different bands. For example, the UE 102 may send an uplink transmission on one carrier while concurrently receiving a downlink transmission on another carrier.

Figure 3:
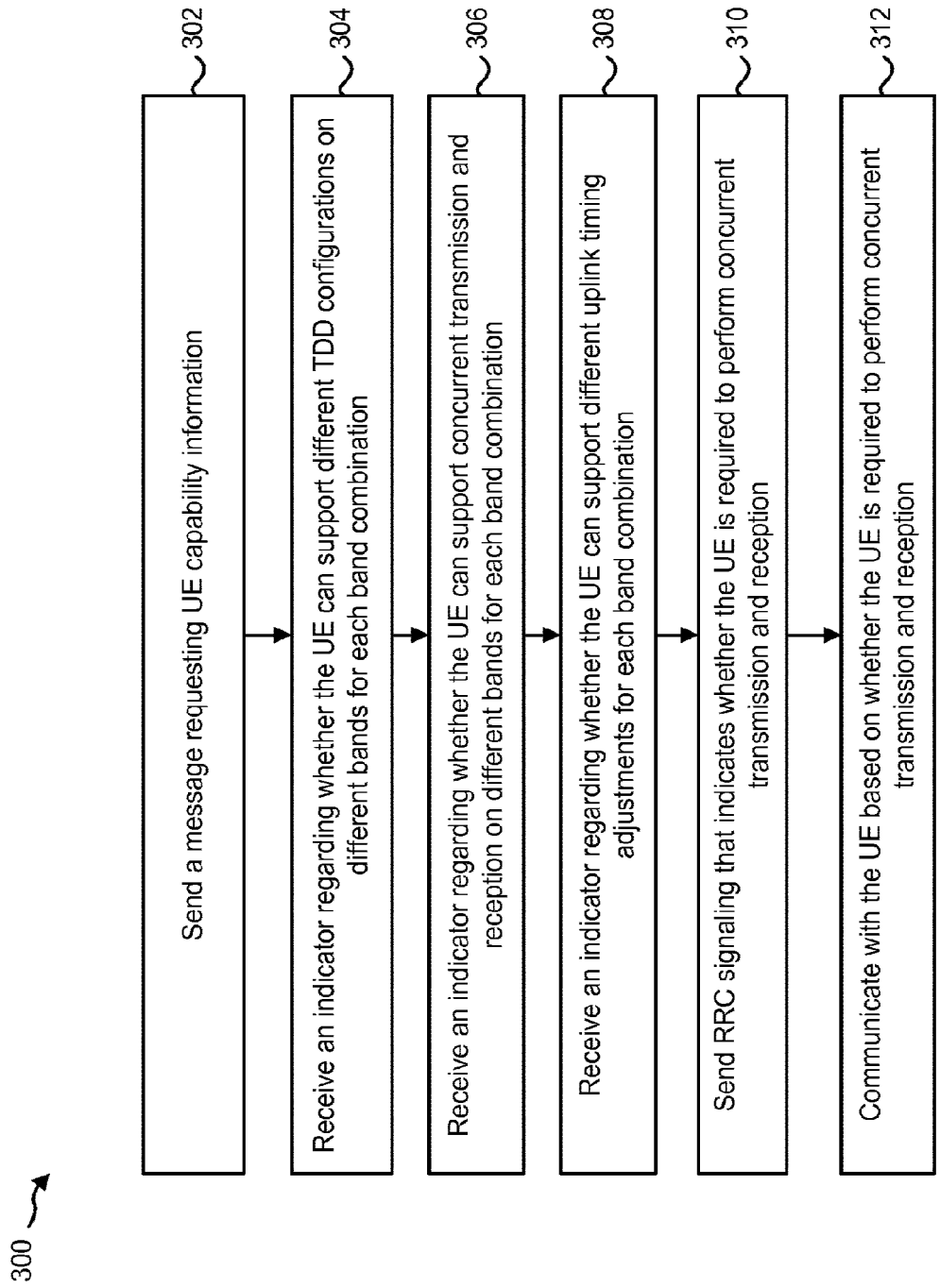

FIG. 3 is a flow diagram illustrating one configuration of a method 300 for receiving signaling for UE 102 capability. For example, the method 300 may describe receiving signaling for UE 102 capability for carrier aggregation. An eNB 160 may send 302 a message requesting UE 102 capability information. For example, an eNB 160 may send a UE 102 capability enquiry or UE 102 capability request.

A UE 102 may indicate its capability to an eNB 160. For example, the eNB 160 may receive 304 an indicator regarding whether the UE 102 can support different TDD configurations on different bands for one or more band combinations. For instance, the UE 102 informs an eNB 160 of its capability, including whether the UE 102 can support different TDD configurations on different bands for each band combination.

In one configuration, the indicator that is received 304 may comprise a UE category indicator. For example, UEs in a particular category may be capable of supporting different TDD configurations, which may be indicated by a UE category indicator. In another configuration, the indicator that is received 304 may comprise information that indicates compliance with a particular specification release. For example, all Release-11 UEs may be capable of supporting different TDD configurations, which may be indicated by a compliance or release number indicator.

The eNB 160 may receive 306 an indicator regarding whether the UE 102 can support concurrent transmission and reception on different bands for each band combination. For example, the UE 102 informs an eNB 160 of its capability, including whether the UE 102 can support simultaneous transmission and reception on different bands for each band combination.

In one configuration, the indicator that is received 306 may comprise a UE category indicator. For example, UEs in a particular category may be capable of supporting concurrent transmission and reception on different bands, which may be indicated by a UE category indicator. In another configuration, the indicator that is received 306 may comprise information that indicates compliance with a particular specification release. For example, all Release-11 UEs may be capable of supporting concurrent transmission and reception on different bands, which may be indicated by a compliance or release number indicator.

The eNB 160 may receive 308 an indicator regarding whether the UE 102 can support different uplink timing adjustments for each band combination. For example, the UE 102 informs an eNB 160 of its capability to support different uplink timing adjustments for each band combination. One or more of the indicator(s) received 304, 306, 308 indicating UE 102 capability may be formatted in accordance with the description given in connection with FIG. 5 below. One or more of the indicators may be received in one or more messages and/or may be indicated explicitly or implicitly.

In one configuration, the indicator that is received 308 may comprise a UE category indicator. For example, UEs in a particular category may be capable of supporting different uplink timing adjustments for each band combination, which may be indicated by a UE category indicator. In another configuration, the indicator that is received 308 may comprise information that indicates compliance with a particular specification release. For example, all Release-11 UEs may be capable of supporting different uplink timing adjustments for each band combination, which may be indicated by a compliance or release number indicator.

The eNB 160 may send 310 radio resource control (RRC) signaling that indicates whether the UE 102 is required to perform concurrent transmission and reception. For example, the eNB 160 may send an RRCConnectionReconfiguration message that indicates whether the UE 102 is required to communicate according to full duplex or half duplex. In some cases, the eNB 160 may send 310 the RRC signaling based on UE 102 capabilities.

In some configurations, the eNB 160 may also receive signaling from the UE 102 that indicates that the UE 102 has been reconfigured (for full duplex or half duplex communications, for example). For instance, the eNB 160 may receive an RRCConnectionReconfigurationComplete message.

The eNB 160 may communicate 312 with the UE 102 based on whether the UE 102 is required to perform concurrent transmission and reception (according to the RRC signaling, for instance). For example, the eNB 160 may schedule downlink and/or uplink communications based on full duplex or half duplex communications. In some configurations, these communications 310 may also be based on whether the UE 102 can support different TDD configurations on different bands, can support concurrent transmission and reception on different bands and can support different uplink timing adjustments for each band combination. The eNB 160 may additionally or alternatively transmit information to the UE 102 and/or receive information from the UE 102 based on the UE capability information.

Figure 4:
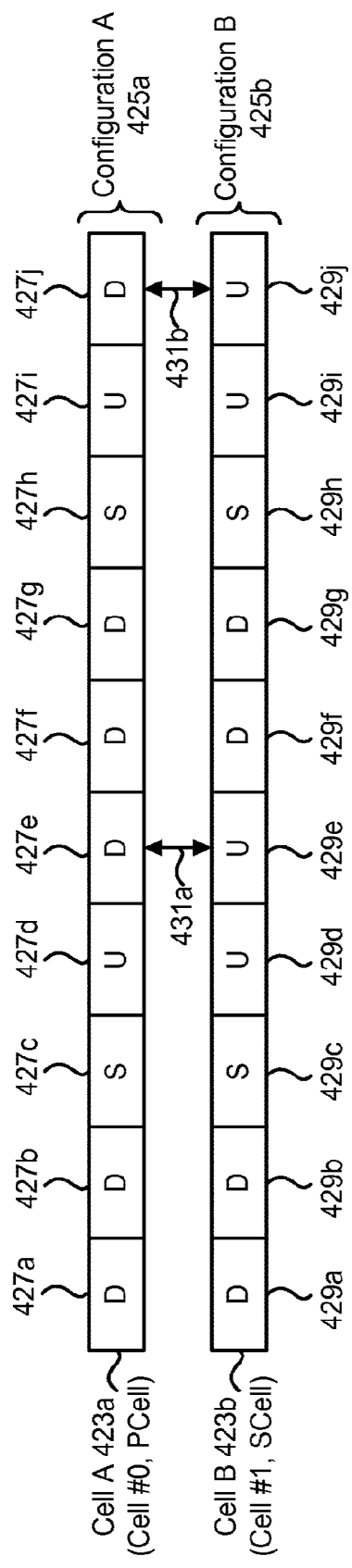

FIG. 4 is a diagram illustrating sets of subframes 427a-j, 429a-j for multiple cells. More specifically, FIG. 4 illustrates different TDD configurations 425a-b between two cells 423a-b that are in different bands and are operated by carrier aggregation. In FIG. 4, "D" may denote a downlink subframe and "U" may denote an uplink subframe.

Different frequency bands are typically covered by different radio frequency (RF) chains in the same device, so an eNB 160 and a user equipment (UE) 102 may have independent RF operations on different bands. However, the problem with different TDD configurations on different bands is that simultaneous transmission and reception on different bands may need to be supported in some subframes 427a-j, 429a-j.

For example, FIG. 4 illustrates a group of subframes 427a-j according to configuration A 425a (e.g., "Config 1") for cell A 423a (e.g., cell #0 or a primary cell (PCell)). Furthermore, another group of subframes 429a-j according to a configuration B 425b (e.g., "Config 2") for cell B 423b (e.g., a cell #1 or a secondary cell (SCell)) are also illustrated. As shown in FIG. 4, simultaneous transmission and reception 431 a-b may occur when a downlink subframe (e.g., subframes 427e, 427j) in one cell (e.g., cell A 423a) occurs at the same time that an uplink subframe (e.g., subframes 429e, 429j) occurs in another cell (e.g., cell B 423b). Subframes (e.g., subframes 427e and 429e and subframes 427j and 429j) where different types of subframes (e.g., "D" and "U") occur on different configurations 425a-b in the same subframe (e.g., concurrently) may be referred to as "collision" subframes.

Simultaneous transmission and reception on different bands may not pose a significant problem for an eNB 160. For a UE 102, however, the additional cost and complexity of RF equipment to isolate the transmitted signal from a desired received signal may not be negligible. For example, in some cases where the frequency separation is not large enough, a duplexer, circulator or isolator may need to be inserted between the RF chains in the UE 102. UE manufacturers may want to have implementation options on whether a UE supports this feature or not.

In some configurations, the eNB 160 may switch UE communications (e.g., behavior) between half duplex and full duplex. The UE 102 may get the benefit of power saving if half duplex is used.

In carrier aggregation when a UE 102 can perform an uplink timing adjustment in each set of one or more cells, the UE 102 must have more than one transmitter. Carriers may or may not wish to require all UEs to operate with these configurations simultaneously. Furthermore, UE manufacturers may want to have implementation options on whether a UE supports this feature or not.

Figure 5:
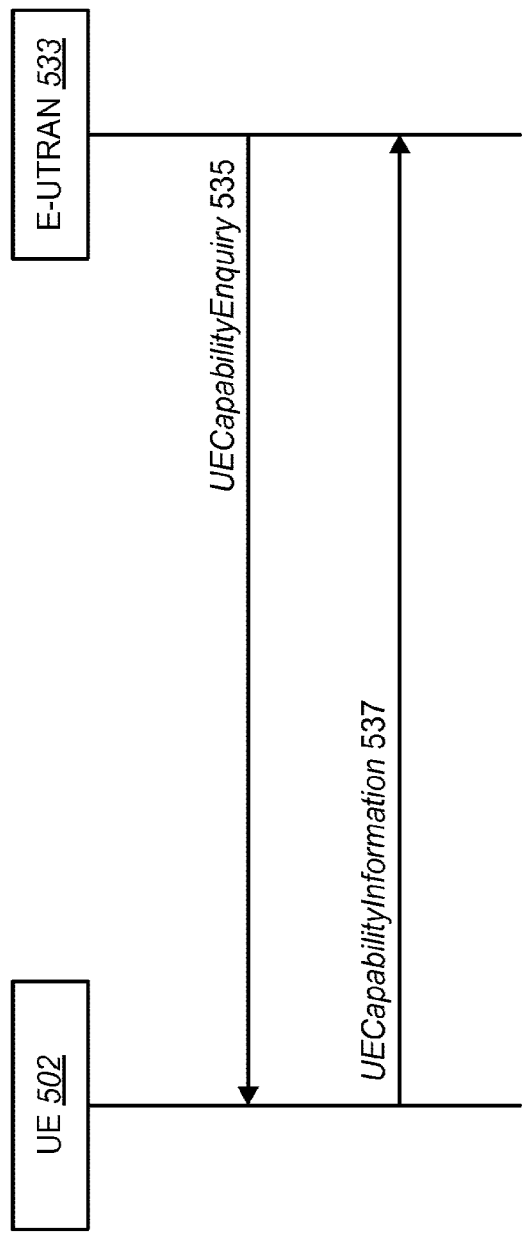

FIG. 5 is a block diagram illustrating one configuration of user equipment (UE) 502 capability signaling. In Rel-10, a UE 502 may provide UE capability information 537 to an eNB 160. The purpose of this procedure is to transfer UE 502 radio access capability information from the UE 502 to an E-UTRAN (Evolved Universal Terrestrial Radio Access Network) (via an eNB 160, for example).

If the UE 502 has changed its E-UTRAN radio access capabilities, the UE 502 (e.g., via radio resource control (RRC) signaling) may send a signal to request higher layers to initiate the necessary NAS (non-access stratum) procedures (see TS 23.401) that would result in the update of UE 502 radio access capabilities using a new radio resource control (RRC) connection. It should be noted that changing a UE's 502 GERAN (GSM Radio Access Network) radio capabilities in an RRC_IDLE mode is supported by the use of a Tracking Area Update. The E-UTRAN 533 may initiate the procedure to a UE 502 in an RRC_CONNECTED state when it 533 needs (additional) UE 502 radio access capability information.

The UE 502 sets the contents of a UECapabilityInformation message 537 as follows. If a ue-CapabilityRequest (or a UECapabilityEnquiry 535 for example) includes eutra, then the UE 502 may include a UE-EUTRA-Capability within a ue-CapabilityRAT-Container and with the rat-Type set to eutra. The UE 502 (e.g., RRC) may submit the UECapabilityInformation message to lower layers for transmission, upon which the procedure may end. It should be noted that higher or lower layers may be based on an RRC specification.

The UL-DCCH-Message class is the set of RRC messages that may be sent from the UE 502 to the E-UTRAN 533 on the uplink DCCH logical channel. A UL-DCCH-Message has the following types as illustrated in Listing (1).

Listing (1)

```
UL-DCCH-MessageType ::= CHOICE {
    c1                      CHOICE {
    csfbParametersRequestCDMA2000    CSFBParametersRequestCDMA2000,
    measurementReport                MeasurementReport,
    rrcConnectionReconfiguration-
    Complete
        RRCConnectionReconfigurationComplete,
    rrcConnectionReestablishmentComplete
        RRCConnectionReestablishmentComplete,
    rrcConnectionSetupComplete       RRCConnectionSetupComplete,
    securityModeComplete             SecurityModeComplete,
    securityModeFailure              SecurityModeFailure,
    ueCapabilityInformation          UECapabilityInformation,
    ulHandoverPreparationTransfer    ULHandoverPreparationTransfer,
    ulInformationTransfer            ULInformationTransfer,
    counterCheckResponse             CounterCheckResponse,
    ueInformationResponse-r9         UEInformationResponse-r9,
    proximityIndication-r9           ProximityIndication-r9,
    rnReconfigurationComplete-r10    RNReconfigurationComplete-r10,
    mbmsCountingResponse-r10         MBMSCountingResponse-r10,
    interFreqRSTDMeasurementIndication-r10
        InterFreqRSTDMeasurementIndication-r10
    },
    messageClassExtension   SEQUENCE { }
}
```

UECapabilityInformation 537 is type of a UL-DCCH-Message. The UECapabilityInformation message 537 may be used to transfer information regarding UE 502 radio access capabilities requested by the E-UTRAN 533. UE-EUTRA-Capability is a UE's 502 EUTRA-related capability as illustrated in Listing (2).

Listing (2)

```
UE-EUTRA-Capability ::=  SEQUENCE {
    accessStratumRelease     AccessStratumRelease,
    ue-Category              INTEGER (1..5),
    pdcp-Parameters          PDCP-Parameters,
    phyLayerParameters       PhyLayerParameters,
    rf-Parameters            RF-Parameters,
    measParameters           MeasParameters,
    featureGroupIndicators   BIT STRING (SIZE (32))    OPTIONAL,
    interRAT-Parameters      SEQUENCE {
        utraFDD              IRAT-ParametersUTRA-FDD      OPTIONAL,
        utraTDD128           IRAT-ParametersUTRA-TDD128   OPTIONAL,
        utraTDD384           IRAT-ParametersUTRA-TDD384   OPTIONAL,
```

-continued

| Listing (2) |
| --- |
| ```
    utraTDD768           IRAT-ParametersUTRA-TDD768   OPTIONAL,
    geran                IRAT-ParametersGERAN         OPTIONAL,
    cdma2000-HRPD        IRAT-ParametersCDMA2000-HRPD OPTIONAL,
    cdma2000-1xRTT       IRAT-ParametersCDMA2000-1XRTT OPTIONAL
},
    nonCriticalExtension UE-EUTRA-Capability-v920-IEs OPTIONAL
}
UE-EUTRA-Capability-v920-IEs ::=   SEQUENCE {
    phyLayerParameters-v920         PhyLayerParameters-v920,
    interRAT-ParametersGERAN-v920   IRAT-ParametersGERAN-v920,
    interRAT-ParametersUTRA-v920 IRAT-ParametersUTRA-v920  OPTIONAL,
    interRAT-ParametersCDMA2000-v920
       IRAT-ParametersCDMA2000-1XRTT-v920              OPTIONAL,
    deviceType-r9   ENUMERATED {noBenFromBatConsumpOpt}  OPTIONAL,
    csg-ProximityIndicationParameters-r9
       CSG-ProximityIndicationParameters-r9,
    neighCellSI-AcquisitionParameters-r9
       NeighCellSI-AcquisitionParameters-r9,
    son-Parameters-r9    SON-Parameters-r9,
    nonCriticalExtension UE-EUTRA-Capability-v940-IEs   OPTIONAL
}
UE-EUTRA-Capability-v940-IEs ::=   SEQUENCE {
    lateNonCriticalExtension  OCTET STRING             OPTIONAL,
    nonCriticalExtension      UE-EUTRA-Capability-v1020-IEs OPTIONAL
}
UE-EUTRA-Capability-v1020-IEs ::= SEQUENCE {
    ue-Category-v1020      INTEGER (6..8)              OPTIONAL,
    phyLayerParameters-v1020  PhyLayerParameters-v1020 OPTIONAL,
    rf-Parameters-v1020    RF-Parameters-v1020         OPTIONAL,
    measParameters-v1020   MeasParameters-v1020        OPTIONAL,
    featureGroupIndicators-v1020  BIT STRING (SIZE (32)) OPTIONAL,
    interRAT-ParametersCDMA2000-v1020
       IRAT-ParametersCDMA2000-1XRTT-v1020             OPTIONAL,
    ue-BasedNetwPerfMeasParameters-r10 UE-
       BasedNetwPerfMeasParameters-r10                 OPTIONAL,
    interRAT-ParametersUTRA-TDD-v1020
       IRAT-ParametersUTRA-TDD-v1020                   OPTIONAL,
    nonCriticalExtension   SEQUENCE { }                OPTIONAL
}
``` |

A Rel-10 UE can include rf-Parameters and rf-Parameters-v1020 in UE-EUTRA-Capability. RF-Parameters and RF-Parameters-v1020 include the information illustrated in Listing (3) and Table (1).

| Listing (3) |
| --- |
| ```
RF-Parameters ::=            SEQUENCE {
    supportedBandListEUTRA       SupportedBandListEUTRA
}
RF-Parameters-v1020 ::=      SEQUENCE {
    supportedBandCombination-r10 SupportedBandCombination-r10
}
SupportedBandCombination-r10 ::= SEQUENCE (SIZE (1..maxBandComb-
r10))OF BandCombinationParameters-r10
BandCombinationParameters-r10 ::= SEQUENCE (SIZE
(1..maxSimultaneousBands-r10)) OF BandParameters-r10
BandParameters-r10 ::= SEQUENCE {
    bandEUTRA-r10            INTEGER (1..64),
    bandParametersUL-r10     BandParametersUL-r10     OPTIONAL,
    bandParametersDL-r10     BandParametersDL-r10     OPTIONAL
}
BandParametersUL-r10 ::= SEQUENCE (SIZE (1..maxBandwidthClass-r10)) OF
CA-MIMO-ParametersUL-r10
CA-MIMO-ParametersUL-r10 ::= SEQUENCE {
    ca-BandwidthClassUL-r10    CA-BandwidthClassUL-r10,
    supportedMIMO-CapabilityUL-r10  MIMO-CapabilityUL-r10  OPTIONAL
}
BandParametersDL-r10 ::= SEQUENCE (SIZE (1..maxBandwidthClass-r10)) OF
CA-MIMO-ParametersDL-r10
CA-MIMO-ParametersDL-r10 ::= SEQUENCE {
    ca-BandwidthClassDL-r10    CA-BandwidthClassDL-r10,
    supportedMIMO-CapabilityDL-r10  MIMO-CapabilityDL-r10 OPTIONAL
}
``` |

-continued

Listing (3)

```
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}
SupportedBandListEUTRA ::= SEQUENCE (SIZE (1..maxBands)) OF
SupportedBandEUTRA
SupportedBandEUTRA ::=          SEQUENCE {
        bandEUTRA               INTEGER (1..64),
        halfDuplex              BOOLEAN
}
MeasParameters ::=              SEQUENCE {
        bandListEUTRA           BandListEUTRA
}
MeasParameters-v1020 ::=        SEQUENCE {
        bandCombinationListEUTRA-r10    BandCombinationListEUTRA-r10
}
BandListEUTRA ::= SEQUENCE (SIZE (1..maxBands)) OF BandInfoEUTRA
BandCombinationListEUTRA-r10 ::= SEQUENCE (SIZE (1..maxBandComb-
r10)) OF BandInfoEUTRA
BandInfoEUTRA ::=               SEQUENCE {
    interFreqBandList           InterFreqBandList,
    interRAT-BandList           InterRAT-BandList       OPTIONAL
}
InterFreqBandList ::= SEQUENCE (SIZE (1..maxBands)) OF InterFreqBandInfo
InterFreqBandInfo ::=           SEQUENCE {
    interFreqNeedForGaps        BOOLEAN
}
maxBandComb-r10             -- Maximum number of band combinations.
maxBands                    -- Maximum number of bands listed in EUTRA UE caps
maxBandwidthClass-r10       -- Maximum number of supported CA BW classes per
band
maxSimultaneousBands-r10    -- Maximum number of simultaneously aggregated
bands
```

TABLE (1)

| | |
|---|---|
| bandCombinationListEUTRA | |
| One entry corresponding to each supported band combination listed in the same order as in supportedBandCombination | |
| bandEUTRA | |
| E-UTRA band as defined in TS 36.101 | |
| bandListEUTRA | |
| One entry corresponding to each supported E-UTRA band listed in the same order as in supportedBandListEUTRA This field shall include all bands that are indicated in BandCombinationParameters-r10 | |
| CA-Bandwidth Class | |
| The CA bandwidth class supported by the UE as defined in TS 36.101 | |
| halfDuplex | |
| If halfDuplex is set to true, only half duplex operation is supported for the band, otherwise full duplex operation is supported | |
| interFreqBandList | |
| One entry corresponding to each supported E-UTRA band listed in the same order as in supportedBandListEUTRA | |
| interFreqNeedForGaps | |
| Indicates need for measurement gaps when operating on the E-UTRA band | |
| given by the entry in bandListEUTRA or on the E-UTRA band combination given by the entry in bandCombinationListEUTRA and measuring on the E-UTRA band given by the entry in interFreqBandList | |
| MIMO-CapabilityDL | |
| The number of supported layers for spatial multiplexing in DL | |
| MIMO-CapabilityUL | |
| The number of supported layers for spatial multiplexing in UL | |

All the combinations of CA-MIMO-ParametersUL and CA-MIMO-ParametersDL for one band and across all the bands in each BandCombinationParameters are supported by the UE 502 and have the same measurement gap requirement (e.g., the same BandInfoEUTRA applies). The BandCombinationParameters for the same band combination can be included more than once.

In Rel-11, UE-EUTRA-Capability-v11xx-IEs and RF-Parameters-v11xx may be introduced. One example is given in Listing (4). In particular, the "nonCriticalExtension" "UE-EUTRA-Capability-v11xx-IEs" may be introduced. Furthermore, the "UE-EUTRA-Capability-v11xx-IEs" may include "rf-Parameters-v11xx."

Listing (4)

```
UE-EUTRA-Capability-v1020-IEs ::= SEQUENCE {
    ue-Category-v1020           INTEGER (6..8)          OPTIONAL,
    phyLayerParameters-v1020    PhyLayerParameters-v1020 OPTIONAL,
    rf-Parameters-v1020         RF-Parameters-v1020     OPTIONAL,
    measParameters-v1020        MeasParameters-v1020    OPTIONAL,
    featureGroupIndicators-v1020  BIT STRING (SIZE (32)) OPTIONAL,
```

Listing (4)

```
    interRAT-ParametersCDMA2000-v1020  IRAT-ParametersCDMA2000-
1XRTT-v1020                                                OPTIONAL,
    ue-BasedNetwPerfMeasParameters-r10  UE-asedNetwPerfMeasParameters-
r10                                                        OPTIONAL,
    interRAT-ParametersUTRA-TDD-v1020  IRAT-ParametersUTRA-TDD-v1020
                                                           OPTIONAL,
    nonCriticalExtension         UE-EUTRA-Capability-v11xx-IEs  OPTIONAL
}
UE-EUTRA-Capability-v11xx-IEs ::= SEQUENCE {
    rf-Parameters-v11xx          RF-Parameters-v11xx        OPTIONAL,
    nonCriticalExtension         SEQUENCE { }               OPTIONAL
}
RF-Parameters-v11xx ::=          SEQUENCE {
    bandList-r11                 BandList-r11
}
BandList-r11 ::= SEQUENCE (SIZE (1..maxBands)) OF BandInfoEUTRA-r11
BandInfoEUTRA-r11 ::= SEQUENCE (SIZE (1..maxBands)) OF
BandParameters-r11
```

One example of BandParameters-r11 is illustrated in Listing (5) and Table (2), which include bandTDDConfig and bandTA. In this example, it is assumed that an eNB 160 has information regarding whether the UE 102 supports simultaneous transmission and reception between different bands in which the UE 502 may support different TDD configurations. For example, it is possible in the case that this feature is linked to a UE 502 category or that this feature is supported by all Rel-11 UEs. However, bandTDDConfig and bandTA are informed to the eNB by a UE 502.

Listing (5)

```
BandParameters-r11 ::= SEQUENCE {
    tddConfgList      TDDConfigList
    taList            TAList
}
TDDConfigList ::= SEQUENCE (SIZE (1.. maxBands)) OF
BandTDDConfig
BandTDDConfig ::=         SEQUENCE {
    bandTDDConfig           ENUMERATED {supported}
}
TAList ::= SEQUENCE (SIZE (1.. maxBands)) OF BandTA
BandTA ::=               SEQUENCE {
    bandTA                 ENUMERATED {supported}
}
```

TABLE (2)

| |
|---|
| BandTDDConfig |
| Indicates whether the UE supports different TDD-Config between the E-UTRA band given by the entry in bandList-r11 and the E-UTRA band given by the entry in tddConfigList |
| BandTA |
| Indicates whether the UE supports different Time Alignment between the E-UTRA band given by the entry in bandList-r11 and the E-UTRA band given by the entry in tddConfigList |
| TddConfigList |
| One entry corresponding to each supported E-UTRA band listed in the same order as in supportedBandListEUTRA |
| TaList |
| One entry corresponding to each supported E-UTRA band listed in the same order as in supportedBandListEUTRA |
| bandList-r11 |
| One entry corresponding to each supported E-UTRA band listed in the same order as in supportedBandListEUTRA |

Another example of BandParameters-r11 is given in Listing (6) and Table (3), which include bandTDDConfig, bandTDDDuplex and bandTA.

Listing (6)

```
BandParameters-r11 ::= SEQUENCE {
    tddConfigList     TDDConfigList
    tddDuplexList     TDDDuplexList
    taList            TAList
}
TDDConfigList ::= SEQUENCE (SIZE (1.. maxBands))
OF BandTDDConfig
BandTDDconfig ::=         SEQUENCE {
    bandTDDConfig           ENUMERATED {supported}
}
TDDDuplexList ::= SEQUENCE (SIZE (1.. maxBands))
OF BandTDDDuplex
BandTDDDuplex ::=         SEQUENCE {
    bandTDDDuplex           ENUMERATED {supported}
}
TAList ::= SEQUENCE (SIZE (1.. maxBands)) OF BandTA
BandTA ::=               SEQUENCE {
    bandTA                 ENUMERATED {supported}
}
```

TABLE (3)

| |
|---|
| BandTDDConfig |
| Indicates whether the UE supports different TDD-Config between the E-UTRA band given by the entry in bandList-r11 and the E-UTRA band given by the entry in tddConfigList |
| BandTDDDuplex |
| Indicates whether the UE supports simultaneous transmission and reception between the E-UTRA band given by the entry in bandList-r11 and the E-UTRA band given by the entry in tddDuplexList |
| BandTA |
| Indicates whether the UE supports different Time Alignment between the E-UTRA band given by the entry in bandList-r11 and the E-UTRA band given by the entry in tddConfigList |

TABLE (3)-continued

TddConfigList

One entry corresponding to each supported E-UTRA band listed in the
same order as in supportedBandListEUTRA
TddDuplexList One entry corresponding to each supported E-UTRA band listed in the
same order as in supportedBandListEUTRA
TaList One entry corresponding to each supported E-UTRA band listed in the
same order as in supportedBandListEUTRA
bandList-r11

One entry corresponding to each supported E-UTRA band listed in the
same order as in supportedBandListEUTRA Yet another example of BandParameters-r11 is illustrated in Listing (7) and Table (4), which include bandTDDDuplex and bandTA. In this case, it is assumed that the eNB knows if a UE 502 supports different TDD configurations between different bands. For example, it is possible in this case that this feature is linked to a UE 502 category or that this feature is supported by all Rel-11 UEs. However, bandTDDDuplex and bandTA are informed to the eNB by the UE 502.

Listing (7)

```
BandParameters-r11 ::= SEQUENCE {
    tddDuplexList      TDDDuplexList
    taList             TAList
}
TDDDuplexList ::= SEQUENCE (SIZE (1.. maxBands))
OF BandTDDDuplex
BandTDDDuplex ::=      SEQUENCE {
    bandTDDDuplex           ENUMERATED {supported}
}
TAList ::= SEQUENCE (SIZE (1.. maxBands)) OF BandTA
BandTA ::=             SEQUENCE {
    bandTA                  ENUMERATED {supported}
}
```

TABLE (4)

bandTDDDuplex

Indicates whether the UE supports simultaneous transmission and
reception between the E-UTRA band given by the entry in bandList-r11
and the E-UTRA band given by the entry in tddDuplexList
bandTA Indicates whether the UE supports different Time Alignment between the
E-UTRA band given by the entry in bandList-r11 and the E-UTRA band
given by the entry in tddConfigList
tddDuplexList One entry corresponding to each supported E-UTRA band listed in the
same order as in supportedBandListEUTRA
taList One entry corresponding to each supported E-UTRA band listed in the
same order as in supportedBandListEUTRA
bandList-r11

One entry corresponding to each supported E-UTRA band listed in the
same order as in supportedBandListEUTRA Yet another example of BandParameters-r11 is illustrated in Listing (8) and Table (5), which include bandTDDDuplex. In this case, it is assumed that the eNB knows if a UE supports different TDD configurations and different Time Alignment between different bands. For example, it is possible in this case that this feature is linked to a UE 502 category or that this feature is supported by all Rel-11 UEs. However, bandTDDDuplex is informed to the eNB by the UE 502.

Listing (8)

```
BandParameters-r11 ::= SEQUENCE {
    tddDuplexList      TDDDuplexList
}
TDDDuplexList ::= SEQUENCE (SIZE (1.. maxBands))
OF BandTDDDuplex
BandTDDDuplex ::=      SEQUENCE {
    bandTDDDuplex           ENUMERATED {supported}
}
```

TABLE (5)

bandTDDDuplex

Indicates whether the UE supports simultaneous transmission and
reception between the E-UTRA band given by the entry in bandList-r11
and the E-UTRA band given by the entry in tddDuplexList
tddDuplexList One entry corresponding to each supported E-UTRA band listed in the
same order as in supportedBandListEUTRA
bandList-r11

One entry corresponding to each supported E-UTRA band listed in the
same order as in supportedBandListEUTRA One benefit of the systems and methods disclosed herein is that manufacturers can make various types of UEs of varying cost and performance with regards to the RF capability and throughput and the system can accommodate such various types of UEs.

Figure 6:
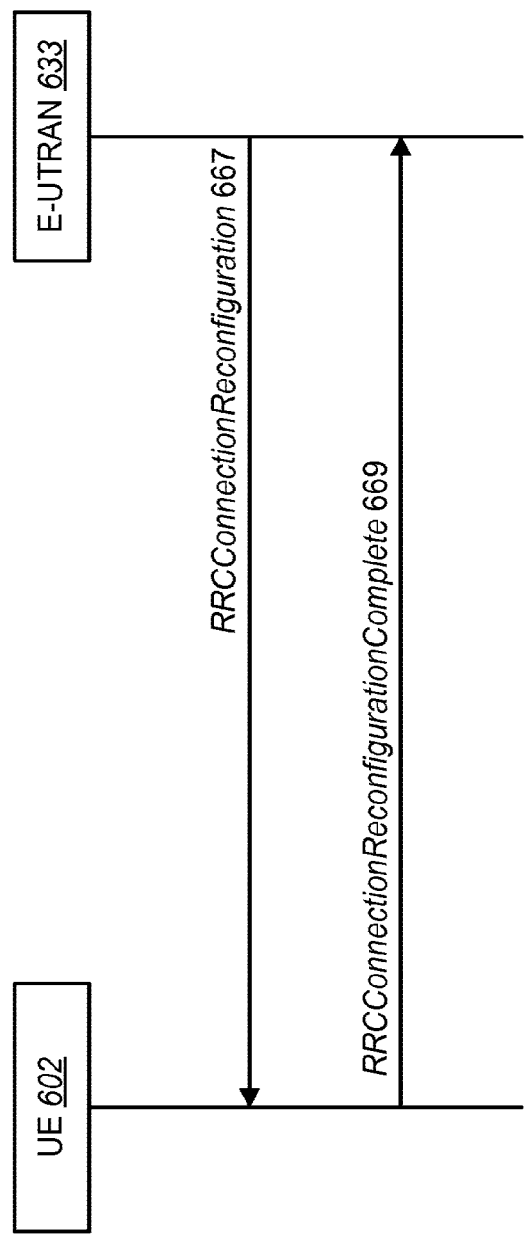

FIG. 6 is a block diagram illustrating one configuration of RRC signaling. As described above, the eNB 160 may be informed of UE 102 capability by the UE 102 and the eNB 160 may schedule the UE 102 according to the UE 102 capability in a case of different TDD configurations between two cells that are in different bands. In some implementations, however, the eNB 160 may further require the UE 102 to be configured for half duplex communications even if the UE 102 has the capability to support simultaneous transmission and reception in a case of different TDD configurations between two cells that are in different bands.

For example, the UE 602 may be configured by the E-UTRAN 633 (e.g., eNB 160) using RRC signaling that indicates whether the UE 602 is required to perform simultaneous transmission and reception or not. For instance, the E-UTRAN 633 (e.g., eNB 160) may send RRCConnectionReconfiguration 667 signaling to the UE 602. In some implementations, the UE 602 may respond with RRCConnectionReconfigurationComplete 669 signaling when the UE 602 has successfully set (e.g., reconfigured) a duplexing type for communications.

If the UE 602 is configured with not performing simultaneous transmission and reception, the UE 602 may follow one of the subframe configurations for all cells in the collision subframe in which uplink and downlink are collided among cells. Alternatively, the UE 602 may select one of the subframe configurations and mute other cells with other subframe configuration in the collision subframe. Then, in a subframe in which uplink and downlink communications are collided, the UE 602 may use the subframe as an uplink subframe, a downlink subframe or a special subframe.

Whether the UE 602 is required to perform simultaneous transmission and reception or not may be UE 602 specific or band combination specific or cell combination specific. If it is UE 602 specific, it may be enough to have one bit for the current carrier aggregation configuration. If it is band combination specific or cell combination specific, it may be needed to have one bit for each band combination or cell combination.

Configuring the UE 602 may be accomplished by using an RRC connection reconfiguration procedure that is used to modify an RRC connection. For example, the RRC connection reconfiguration procedure may establish, modify or release resource blocks (RBs), may perform handover, may setup, modify or release measurements and/or may add, modify or release SCells 121. It should be noted that enabling the system (e.g., the E-UTRAN 633) to require the UE 602 to change RF operation may be beneficial. For example, the UE 602 may reduce power consumption by using half duplex communications.

Figure 7:
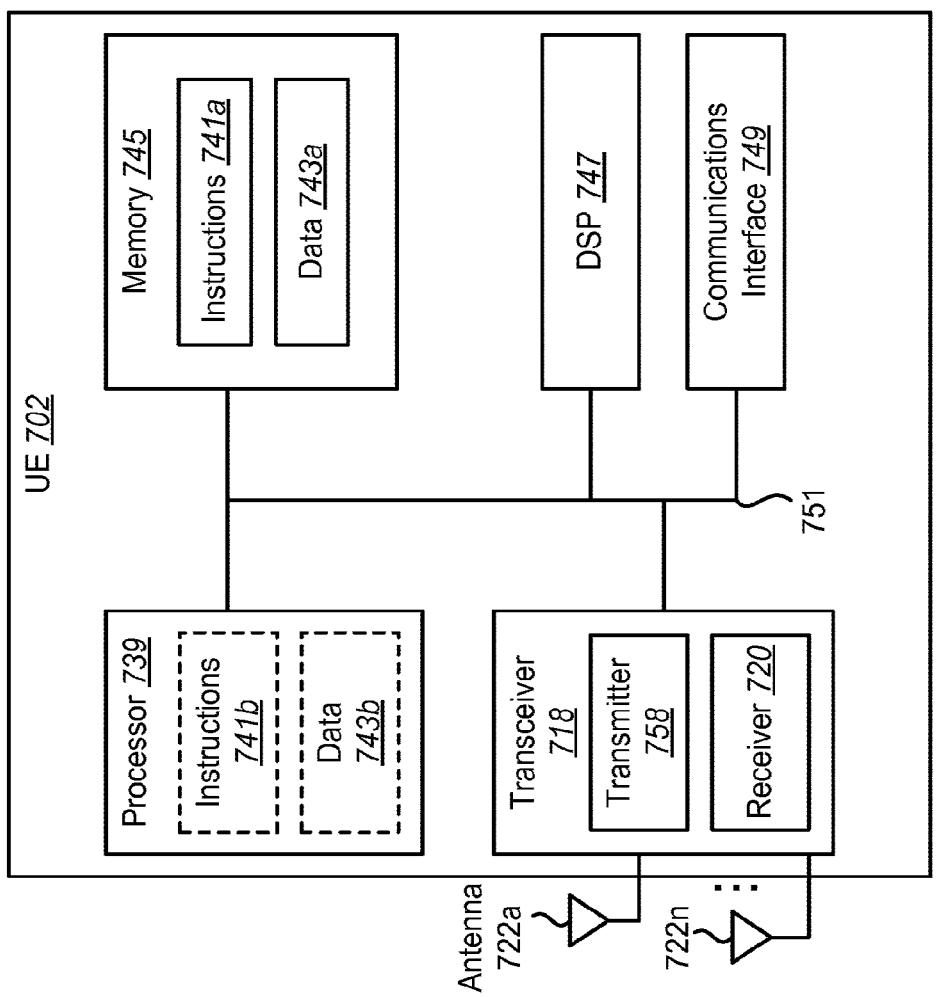

FIG. 7 illustrates various components that may be utilized in a user equipment (UE) 702. The UE 702 may be utilized as one or more of the UEs 102, 502 described above. The UE 702 includes a processor 739 that controls operation of the UE 702. The processor 739 may also be referred to as a central processing unit (CPU). Memory 745, which may include read-only memory (ROM), random access memory (RAM), a combination of the two or any type of device that may store information, provides instructions 741a and data 743a to the processor 739. A portion of the memory 745 may also include non-volatile random access memory (NVRAM). Instructions 741b and data 743b may also reside in the processor 739. Instructions 741b and/or data 743b loaded into the processor 739 may also include instructions 741a and/or data 743a from memory 745 that were loaded for execution or processing by the processor 739. The instructions 741b may be executed by the processor 739 to implement one or more of the methods disclosed herein.

The UE 702 may also include a housing that contains one or more transmitters 758 and one or more receivers 720 to allow transmission and reception of data. The transmitter(s) 758 and receiver(s) 720 may be combined into one or more transceivers 718. One or more antennas 722a-n are attached to the housing and electrically coupled to the transceiver 718.

The various components of the UE 702 are coupled together by a bus system 751, which may include a power bus, a control signal bus and a status signal bus, in addition to a data bus. However, for the sake of clarity, the various buses are illustrated in FIG. 7 as the bus system 751. The UE 702 may also include a digital signal processor (DSP) 747 for use in processing signals. The UE 702 may also include a communications interface 749 that provides user access to the functions of the UE 702. The UE 702 illustrated in FIG. 7 is a functional block diagram rather than a listing of specific components.

Figure 8:
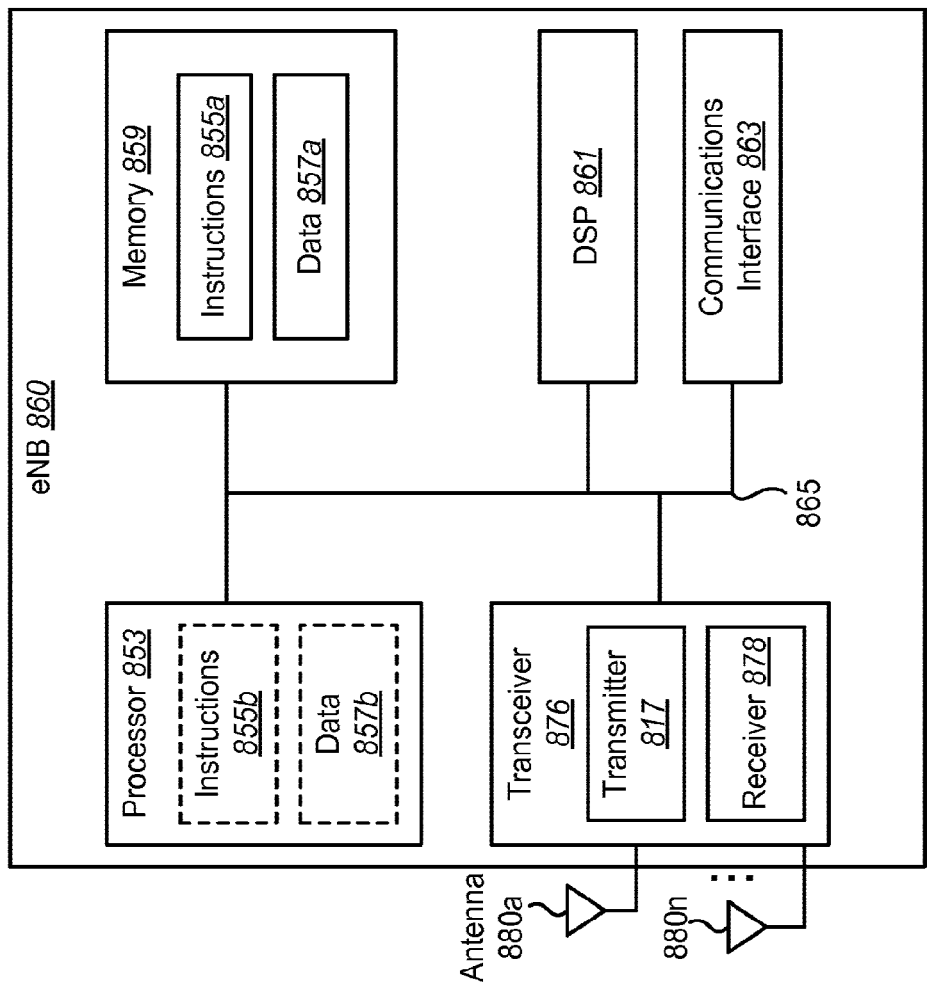

FIG. 8 illustrates various components that may be utilized in an evolved Node B (eNB) 860. The eNB 860 may be utilized as one or more of the eNBs (e.g., eNB 160) described previously. The eNB 860 may include components that are similar to the components discussed above in relation to the UE 602, including a processor 853, memory 859 that provides instructions 855a and data 857a to the processor 853, instructions 855b and data 857b that may reside in or be loaded into the processor 853, a housing that contains one or more transmitters 817 and one or more receivers 878 (which may be combined into one or more transceivers 876), one or more antennas 880a-n electrically coupled to the transceiver(s) 876, a bus system 865, a DSP 861 for use in processing signals, a communications interface 863 and so forth.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE) configured for signaling UE capability, comprising:
   a processor;
   memory in electronic communication with the processor; and
   instructions stored in the memory, the instructions being executable to:
   send, to an evolved Node B (eNB), a radio resource control (RRC) message including capability information of the UE, wherein
   the capability information includes specific information that is configured to indicate, for each band combination of a plurality of band combinations, whether the UE supports different timing adjustments; and
   the capability information is configurable to indicate that (i) the UE supports different timing adjustments for a first band combination of the plurality of band combinations, and (ii) the UE does not support different timing adjustments for a second band combination of the plurality of band combinations.

2. An evolved Node B (eNB) configured for receiving signaling for user equipment (UE) capability, comprising:
   a processor;
   memory in electronic communication with the processor; and
   instructions stored in the memory, the instructions being executable to:
   receive, from a UE, a radio resource control (RRC) message including capability information of the UE, wherein the capability information includes specific information that is configured to indicate, for each band combination of a plurality of band combinations, whether the UE supports different timing adjustments, and
   the capability information is configurable to indicate that (i) the UE supports different timing adjustments for a first band combination of the plurality of band combinations, and (ii) the UE does not support different timing adjustments for a second band combination of the plurality of band combinations.

3. A method for signaling user equipment (UE) capability from a UE, comprising:
   sending, to an evolved Node B (eNB), a radio resource control (RRC) message including capability information of the UE, wherein the capability information includes specific information that is configured to indicate, for each band combination of a plurality of band combinations, whether the UE supports different timing adjustments; wherein
   the capability information is configurable to indicate that (i) the UE supports different timing adjustments for a first band combination of the plurality of band combinations, and (ii) the UE does not support different timing adjustments for a second band combination of the plurality of band combinations.

4. A method for receiving signaling for user equipment (UE) capability by an evolved Node B (eNB), comprising:
   receiving, from a UE, a radio resource control (RRC) message including capability information of the UE, wherein the capability information includes specific information that is configured to indicate, for each band combination of a plurality of band combinations, whether the UE supports different timing adjustments; wherein
   the capability information is configurable to indicate that (i) the UE supports different timing adjustments for a first band combination of the plurality of band combinations, and (ii) the UE does not support different timing adjustments for a second band combination of the plurality of band combinations.

* * * * *